United States Patent
Hoshino et al.

(10) Patent No.: US 9,106,356 B2
(45) Date of Patent: *Aug. 11, 2015

(54) RADIO COMMUNICATION DEVICE AND RADIO COMMUNICATION METHOD

(71) Applicant: Panasonic Corporation, Osaka (JP)

(72) Inventors: Masayuki Hoshino, Kanagawa (JP); Ayako Horiuchi, Kanagawa (JP); Seigo Nakao, Kanagawa (JP); Daichi Imamura, Beijing (CN); Akihiko Nishio, Kanagawa (JP); Yoshihiko Ogawa, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,349

(22) Filed: Mar. 3, 2014

(65) Prior Publication Data

US 2014/0185590 A1 Jul. 3, 2014

Related U.S. Application Data

(63) Continuation of application No. 13/122,572, filed as application No. PCT/JP2009/005529 on Oct. 21, 2009, now Pat. No. 8,705,507.

(30) Foreign Application Priority Data

Oct. 30, 2008 (JP) .................................. 2008-280230

(51) Int. Cl.
*H04J 13/00* (2011.01)
*H04J 11/00* (2006.01)
(Continued)

(52) U.S. Cl.
CPC .......... *H04J 11/0023* (2013.01); *H04B 7/0671* (2013.01); *H04J 13/004* (2013.01);
(Continued)

(58) Field of Classification Search
CPC ........................... H04J 11/0023; H04J 13/004
USPC .......................................... 370/335, 342, 329
See application file for complete search history.

(56) References Cited

U.S. PATENT DOCUMENTS 6,526,091 B1    2/2003   Nystrom et al.
6,680,928 B1 *   1/2004   Dent ............................. 370/342
(Continued)

FOREIGN PATENT DOCUMENTS

RU         2234196 C2    8/2004
WO       00/10277 A1    2/2000

OTHER PUBLICATIONS

Russian Decision on Grant for Application No. 2011117566/07(026092) dated Sep. 27, 2013.
(Continued)

*Primary Examiner* — Rasheed Gidado
(74) *Attorney, Agent, or Firm* — Pearne & Gordon LLP

(57) ABSTRACT

When an Ack/Nack signal is transmitted from a user terminal to a base station in an upstream control channel by using an Ack/Nack resource, the signal is code-multiplexed by using a code sequence containing an orthogonal sequence and a cyclic-shifted sequence and transmitted from a plurality of user terminals to the base station. If an aggregation size indicating the number of control signals of the downstream control channel is greater than one, it is determined that no resource located at the right of the axis of the cyclic-shifted amount of the cyclic-shifted sequence in the same orthogonal code of the orthogonal sequence is used, and the Ack/Nack signal to which CDD is applied from a plurality of antennas is transmitted by using a resource ACK #0 allocated to the own device and an unused resource ACK #1, which have the same orthogonal code, but have different cyclic-shifted amounts.

18 Claims, 9 Drawing Sheets

(51) Int. Cl.
  *H04B 7/06*    (2006.01)
  *H04J 13/18*   (2011.01)
  *H04J 13/22*   (2011.01)
  *H04L 1/06*    (2006.01)
  *H04L 1/16*    (2006.01)
  *H04L 1/18*    (2006.01)

(52) U.S. Cl.
  CPC ............. *H04J13/0059* (2013.01); *H04J 13/18* (2013.01); *H04J 13/22* (2013.01); *H04L 1/06* (2013.01); *H04L 1/1692* (2013.01); *H04L 1/1861* (2013.01)

(56) References Cited

U.S. PATENT DOCUMENTS

| | | | |
|---|---|---|---|
| 7,924,755 | B2 | 4/2011 | Xu et al. |
| 8,331,947 | B2 * | 12/2012 | Kim et al. ................... 455/450 |
| 8,351,385 | B2 * | 1/2013 | Imamura et al. ............ 370/329 |
| 8,908,596 | B2 | 12/2014 | Han et al. |
| 2004/0081113 | A1 * | 4/2004 | Earnshaw et al. .......... 370/320 |
| 2009/0303978 | A1 | 12/2009 | Pajukoski et al. |
| 2010/0039997 | A1 | 2/2010 | Ratasuk et al. |
| 2010/0303028 | A1 * | 12/2010 | Gresset et al. .............. 370/329 |
| 2011/0096928 | A1 | 4/2011 | Fukuoks et al. |
| 2011/0194524 | A1 | 8/2011 | Hedlund et al. |

OTHER PUBLICATIONS

Panasonic et al.; Ack/Nack repetition and Implicit Resource Allocation for PUCCH, 3GPP TSG RAN WG1 Meeting #53 R1-081796, 3GPP, May 2008 pp. 1-2.

Panasonic et al.; Analysis of required CCE aggregation sizes, 3GPP TSG-RAN WG1 Meeting #52 R1-080991, 3GPP, Feb. 2008 pp. 1-6.

Nortel et al.; Transmit diversity for PUCCH in LTE-A, 3GPP TSG-RAN WG1 Meeting #54 R1-083159, 3GPP, Aug. 2008, pp. 1.

NTT DoCoMo et al.; "Implicit Resource Allocation of ACK/NACK Signal in E-UTRA Uplink", 3GPP TSG RAN WG1 Meeting #48 R1-071650, 3GPP, Mar. 26-30, 2007 pp. 1-3.

International Search Report for PCT/JP2009/005529 dated Nov. 17, 2009.

Seigo Nakao, et al., Performance improvement of Evolved UTRA uplink control channel for fast fading environments, IEICE Technical Report, The Institute of Electronics, Information and Communication Engineers, Aug. 2008.

Seigo Nakao, et al., Considerations on the scrambling for Evolved UTRA uplink control channel, EICE Technical Report, The Institute of Electronics, Information and Communication Engineers, Oct. 2008.

* cited by examiner

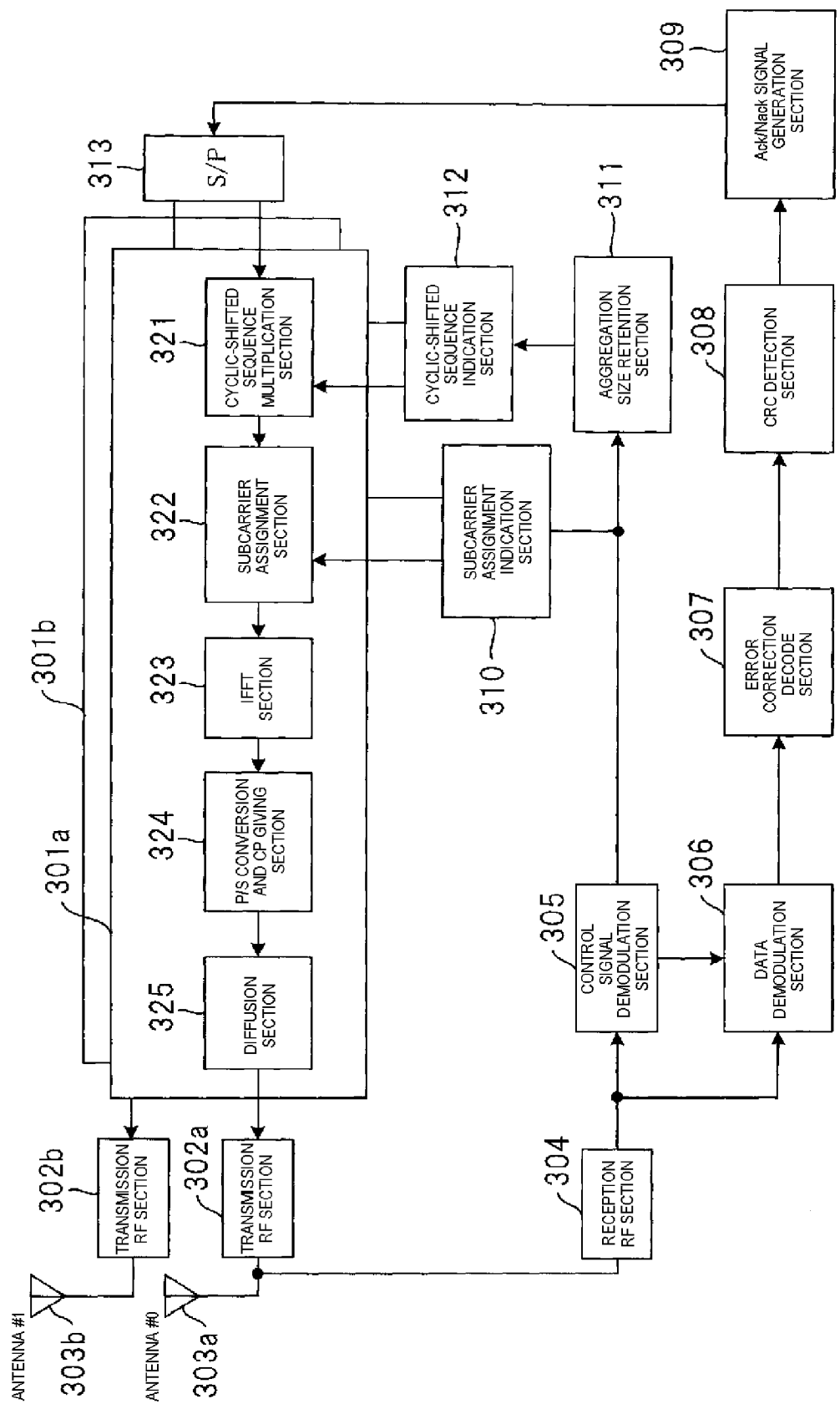

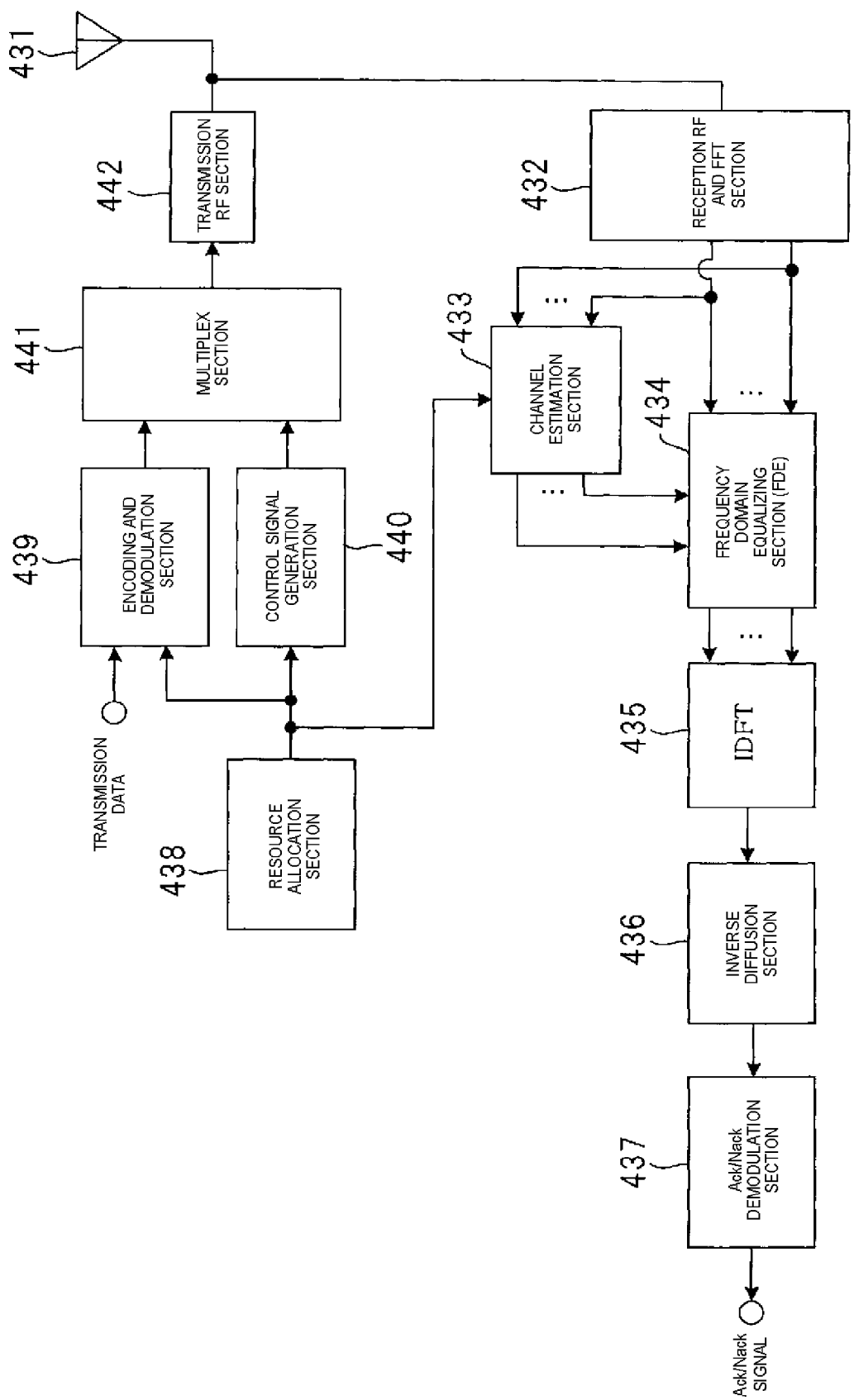

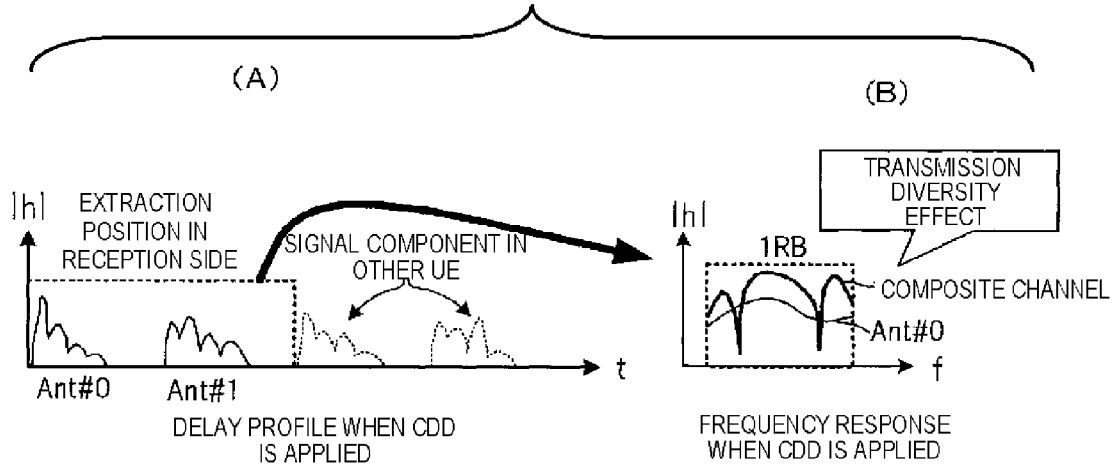
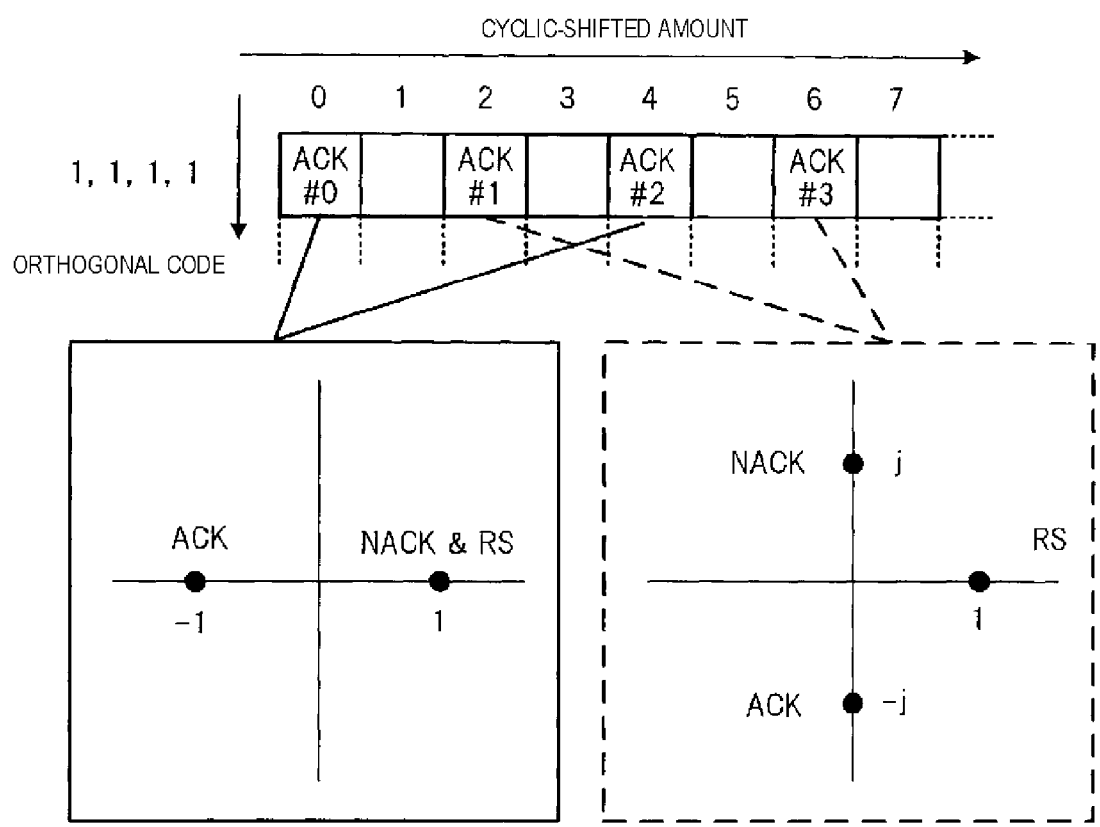

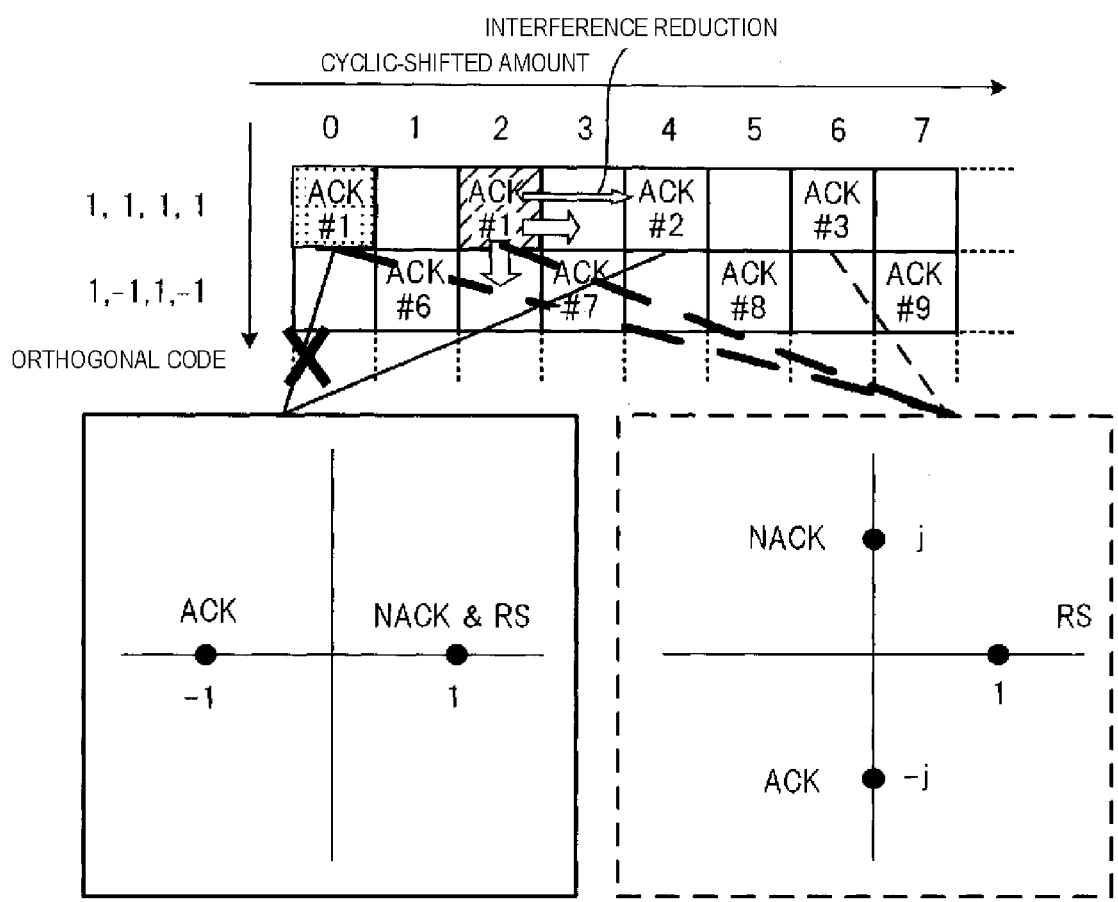

RADIO COMMUNICATION DEVICE AND RADIO COMMUNICATION METHOD

CROSS-REFERENCE TO RELATED APPLICATIONS

This application is a continuation of U.S. patent application Ser. No. 13/122,572 filed on Apr. 5, 2011 which is based on Japanese Patent Application No. 2008-280230 filed on Oct. 30, 2008. The contents of these applications are herein incorporated by reference in their entirety.

TECHNICAL FIELD

The present invention relates to a radio communication device and a radio communication method that can be applied to a radio communication system of a cellular system, etc.

BACKGROUND ART

In a radio communication system for mobile communications of a mobile telephone, etc., various multiplex techniques are used for efficiency of signal transmission in limited resources. In the cellular system for mobile communications, as for an uplink (UL) of communications in an uplink direction from a user terminal to a base station, code multiplexing of signals from a plurality of user terminals to a base station in an uplink control channel for transmitting control information is considered. In an LTE (Long Term Evolution) system considered in 3GP (3rd Generation Partnership Project) of an international standardization group of mobile telephones, an uplink control channel is called PUCCH (Physical Uplink Control Channel) and is stipulated as appropriate in the system resources. In this PUCCH, to share a specific frequency resource among a plurality of user terminals, a configuration of code multiplexing of signals from a plurality of user terminals is adopted for the frequency resource. As a code sequence used for code multiplex, diffusion at two stages of a CAZAC sequence and an orthogonal sequence is used. Signals transmitted in the PUCCH include a demodulation reference signal (DM-RS), control information, etc. The control information includes an Ack/Nack signal for reporting Ack (Acknowledgement) or Nack (Negative Acknowledgement) indicating the demodulation result of a reception signal in a user terminal in a downlink of communications in a downlink direction from a base station to the user terminal and the like.

FIG. 13 shows an example of a code sequence used for each user terminal when code multiplex is performed in an uplink control channel. FIG. 13 shows resource allocation in two code sequences two-dimensionally as a assignment example of code sequence when applied to Ack/Nack signal resources (which will be hereinafter called Ack/Nack resources). In FIG. 13, the horizontal direction indicates the cyclic-shifted amounts of a cyclic-shifted sequence according to a CAZAC sequence and a code sequence having twelve cyclic-shifted amounts of 0 to 11. The vertical direction indicates a plurality of orthogonal codes as an orthogonal sequence and four-symbol codes (1, 1, 1, 1), (1, −1, 1, −1), (1, −1, −1, 1) . . . are used for the orthogonal codes. Each of ACK#0, ACK#1, . . . is the number of the Ack/Nack resource and indicates the position of the resource allocated to each user terminal. The Ack/Nack resources of each user terminal are used at intervals of two cyclic-shifted amounts in the same orthogonal code and are used at interval of one cyclic-shifted amount between the adjacent orthogonal codes, whereby allocation to the adjacent resources is not conducted at intervals of one allocated resource and inter-symbol interference is circumvented (for example, refer to Non-patent Literature 1). According to such allocation of the code sequence, inter-symbol interference is circumvented, and it is made possible to multiplex signals of a plurality of user terminals, so that the effect of increasing the system capacity can be provided.

To improve reliability in a single user terminal in an uplink control channel, application of transmission diversity for transmitting a signal using a plurality of antennas is assumed. In this case, as a simple solution according to the related art to realize the transmission diversity, application of CDD (Cyclic Delay Diversity) for transmitting a cyclically shifted signal in the same code sequence from a plurality of antennas is considered (for example, refer to Non-patent Literature 2).

Delay diversity is a technique of transmitting the same signal from a transmitter by a plurality of antennas and controlling a delay amount so as to produce a sufficient time difference (delay) in signal between antennas. Accordingly, if spacing of the antennas is small, a sufficient difference (time difference) occurs in radio signals arriving at a receiver from the antennas of the transmitter. Thus, the receiver recognizes the difference in radio wave propagation path and can separate each signal for each path and extract the object signal. Accordingly, the diversity effect is provided. In the CDD, the delay time (phase on a frequency axis) is changed cyclically.

FIG. 14 shows an example of resource allocation when CDD is applied in a code sequence to perform code multiplex as shown in FIG. 13. In FIG. 14, Ant#0, Ant#1 indicates the position (cyclic-shifted sequence) of the resource allocated to each antenna as for the same Ack/Nack resource (here, ACK#0). As shown in FIG. 14, different cyclic-shifted amounts are used for signals transmitted from a plurality of antennas, whereby a phase-shifted amount (delay amount) is given and CDD can be realized. Such CDD is applied, whereby frequency selectivity is enhanced about signals from the user terminal and the diversity effect of space-frequency can be provided.

CITATION LIST

Non-Patent Literature

Non-patent Literature 1: 3GPP TSG RAN WG1 #48bis, R1-071650, NTT DoCoMo, Fujitsu, Mitsubishi Electric, "Implicit Resource Allocation of ACK/NACK Signal in E-UTRA Uplink", Mar. 26-30, 2007

Non-patent Literature 2: 3GPP TSG RAN WG1 #54, R1-083159, Nortel, "Transmit diversity for PUCCH in LTE-A", Aug. 18-22, 2008

SUMMARY OF THE INVENTION

Technical Problem

However, if CDD is simply applied as described above in an uplink control channel, as shown in FIG. 14, a new code between already allocated resources (here, cyclic-shifted sequence of the resource indicated by Ant#1 in the figure) is allocated for a plurality of antenna, whereby a problem of interference with adjacent code allocated to a different user terminal (here, cyclic-shifted sequence of the resources indicated by ACK#1 and ACK#6 in the figure and orthogonal code) occurs. Since the cyclic-shifted amount of a cyclic-shifted sequence can also be assumed to be a delay on a time axis, if the resources of adjacent cyclic-shifted amounts in the same orthogonal code are allocated, when a signal delay occurs or the transmission timing between user terminals shifts because of the situation of the propagation path, the possibility of interfering with the resource of an adjacent cyclic-shifted sequence allocated to a different user terminal becomes high. If the same cyclic-shifted amount is allocated between different orthogonal codes, when the fading situation of the propagation path changes due to the time progress as the move speed of a user terminal is large, orthogonality between codes breaks down and interference may occur. Such inter-symbol interference cannot be circumvented by the existing Ack/Nack resource allocation method.

In view of the circumstances described above, it is an object of the invention to provide a radio communication device and a radio communication method that can provide the transmission diversity effect by applying CDD while reducing inter-symbol interference when code multiplex is performed.

Solution to Problem

The present invention provides, as a first aspect, a radio communication device for transmitting a signal using a resource of a control channel in communications in a first direction from the radio communication device to a communicating device, wherein a control channel in the first direction is configured so that a signal to be transmitted from a plurality of radio communication devices containing other device to the communicating device are code-multiplexed using a code sequence containing an orthogonal sequence and a cyclic-shifted sequence and the code-multiplexed signal is transmitted, and the resources of the control channel in the first direction are set for respective codes of the code sequence and are allocated corresponding to control information reported from the communicating device by communications in a second direction from the communicating device to the radio communication device, the radio communication device including: a cyclic delay diversity indication section which is configured to indicate application of cyclic delay diversity with respect to transmission signals if it is determined that a resource located on the right on an axis of a cyclic-shifted amount of the cyclic-shifted sequence in the same orthogonal code of the orthogonal sequence is not used as for the resources allocated to the radio communication device among the resources of the control channel; and a transmission section which is configured, if the cyclic delay diversity is applied in response to the indication from the cyclic delay diversity indication section, to transmit the transmission signals to the communicating device through a plurality of antennas using the resource allocated to the radio communication device and at least one unused resource, which are given different cyclic-shifted amounts in the same orthogonal code.

Accordingly, if it is determined that the resource on the right on the axis of the cyclic-shifted amount of the cyclic-shifted sequence in the same orthogonal code of the orthogonal sequence is not used in the resource set for each code of the code sequence used for code multiplex when the signal is transmitted in the control channel in the first direction from the own device to the communicating device, cyclic delay diversity is executed using the resources which are given different cyclic-shifted amounts in the same orthogonal code, whereby it is made possible to provide transmission diversity effect. At this time, the unused resource on the right in the cyclic-shifted amount is used, whereby if a shift amount is given in a code different in the cyclic-shifted amount and CDD processing is performed, interference with the resources allocated to a different device can be circumvented and it is made possible to reduce inter-symbol interference.

The present invention includes, as a second aspect, the radio communication device in which the cyclic delay diversity indication section determines whether or not the cyclic delay diversity can be applied in response to the control information reported from the communicating device.

Accordingly, it can be determined that the resource on the right on the axis of the cyclic-shifted amount of the cyclic-shifted sequence in the same orthogonal code of the orthogonal sequence is not used as for the resources of the control channel in the first direction allocated corresponding to the control information according to the control information in communications in the second direction reported from the communicating device.

The present invention includes, as a third aspect, the radio communication device in which the resources of the control channel in the first direction are allocated corresponding to aggregation size indicating the size of resources for a control signal in the second direction as the control information reported from the communicating device, the radio communication device including: a second direction control information acquisition section which is configured to acquire the aggregation size as the control information reported from the communicating device, wherein when the aggregation size is larger than 1, the cyclic delay diversity indication section determines that the resource on the right on the axis of the cyclic-shifted amount in the same orthogonal code is not used, and indicates the application of the cyclic delay diversity.

Accordingly, it can be determined that the resource on the right on the axis of the cyclic-shifted amount in the same orthogonal code is not used when the aggregation size is larger than 1 according to the aggregation size indicating the size of the control signal resources in the second direction, and transmission to which CCD is applied is made possible while inter-symbol interference is circumvented.

The present invention includes, as a fourth aspect, the radio communication device in which the transmission section includes a scramble processing section which is configured to execute scramble dependent on the cyclic-shifted amount of the cyclic-shifted sequence in the transmission signal, the radio communication device including: a scrambling indication section which is configured to indicate scramble corresponding to the resource on the right on the axis of the cyclic-shifted amount among the resources to be used, when the cyclic delay diversity is applied.

Accordingly, scramble corresponding to the resource on the right on the axis of the cyclic-shifted amount in a code sequence is applied, so that scramble becomes different from the resource to a different device to the right of the device in the cyclic-shifted amount corresponding to the immediately following resource on the time axis to which the effect of a signal delay can be easily given because of fading, etc. Thus, if the code sequence is cyclically shifted, the effect of the scramble makes it possible to prevent interference with the code sequence allocated to a different device, and inter-symbol interference can be further reduced. The transmission diversity based on CDD can be applied without affecting an existing resource allocation method containing the scramble.

The present invention includes, as a fifth aspect, the radio communication device in which, if the cyclic delay diversity is applied, when resources to which the same scramble is applied exist in usable resources which are given the different cyclic-shifted amounts, the transmission section executes transmission using the resources of the same scramble.

Accordingly, when transmission diversity is applied based on CDD, if the used code sequence is cyclically shifted, the effect of the scramble makes it possible to prevent interference with the code sequence allocated to a different device, and inter-symbol interference can be reduced.

The present invention provides, as a sixth aspect, a radio communication mobile station device including the radio communication device as described above, in which the communicating device is a radio communication base station device, communications in the first direction are communications in an uplink direction from the radio communication mobile station device to the radio communication base station device, and communications in the second direction are communications in a downlink direction from the radio communication base station device to the radio communication mobile station device.

The present invention provides, as a seventh aspect, a radio communication device for receiving a signal sent using a resource of a control channel in communications in a first direction from a communicating device to the radio communication device, wherein a control channel in the first direction is configured so that a signal to be transmitted from a plurality of radio communication devices to the radio communicating device are code-multiplexed using a code sequence containing an orthogonal sequence and a cyclic-shifted sequence and the code-multiplexed signal is transmitted, and the resources of the control channel in the first direction are set for respective codes of the code sequence and are allocated corresponding to control information reported to the communicating device by communications in a second direction from the radio communication device to the communicating device, the radio communication device including: a resource allocation section which is configured to execute resource allocation of communication signals, and configured, if cyclic delay diversity for a transmission signal is applied using resources which are given different cyclic-shifted amounts of the cyclic-shifted sequence in the same orthogonal code of the orthogonal sequence in the communicating device as for the control channel in the first direction, to execute the resource allocation section in which the cyclic delay diversity is considered; and a reception section which is configured to receive a signal transmitted from the communicating device and perform reception processing containing channel estimation of a transmission path between the communicating device and the radio communication device and demodulation of the reception signal in response to the resource allocation of the control channel in the first direction.

Accordingly, in communications of the control channel in the first direction from the communicating device to the own device, while inter-symbol interference when code multiplex is performed is reduced, it is made possible to provide the transmission diversity effect to which CDD is applied.

The present invention includes, as an eighth aspect, the radio communication device in which the resource allocation section executes the resource allocation of the control channel in the first direction corresponding to aggregation size indicating the size of resources for a control signal in the second direction, and if the aggregation size is larger than 1, the resource allocation section executes the resource allocation in which the cyclic delay diversity is considered, the radio communication device including a control signal generation section which is configured to generate a control signal containing the aggregation size as control information to be reported to the communicating device, wherein the reception section performs the reception processing responsive to the resource allocation of the control channel in the first direction based on the aggregation size.

Accordingly, resource allocation considering the cyclic delay diversity in the communicating device is executed when the aggregation size is larger than 1 according to the aggregation size indicating the size of the control signal resources in the second direction, and reception processing assuming the cyclic delay diversity is performed in response to the resource allocation, so that it is made possible to appropriately receive the signal transmitted by applying CDD while inter-symbol interference is circumvented.

The present invention includes, as a ninth aspect, the radio communication device in which when the communicating device executes scramble dependent on the cyclic-shifted amount of the cyclic-shifted sequence for a transmission signal, the resource allocation section executes the resource allocation in which scramble is considered so as to use scramble corresponding to a resource on the right on an axis of the cyclic-shifted amounts, among resources to be used, and the reception section includes an inverse scramble processing section which is configured to execute inverse scramble corresponding to the scramble based on the resource allocation information and demodulates the reception processing.

Accordingly, the signal subjected to CDD processing based on the cyclic-shifted amount of the cyclic-shifted sequence and scramble processing dependent on the cyclic-shifted amount can be received appropriately. When transmission diversity is applied based on CDD, if the used code sequence is cyclically shifted, the effect of the scramble makes it possible to prevent interference with the code sequence allocated to a different device, and inter-symbol interference can be reduced.

The present invention includes, as a tenth aspect, the radio communication device in which, if the cyclic delay diversity is applied in the communicating device and the scramble is executed, when resources to which the same scramble is applied exist in usable resources which are given the different cyclic-shifted amounts, the resource allocation section executes the resource allocation so as to use the resources of the same scramble, and the reception section demodulates the reception signal corresponding to the scramble.

Accordingly, the signal subjected to CDD processing based on the cyclic-shifted amount of the cyclic-shifted sequence and scramble processing dependent on the cyclic-shifted amount can be received appropriately. When transmission diversity is applied based on CDD, if the used code sequence is cyclically shifted, the effect of the scramble makes it possible to prevent interference with the code sequence allocated to a different device, and inter-symbol interference can be reduced.

The present invention provides, as an eleventh aspect, a radio communication base station device including the radio communication device as described above, wherein the communicating device is a radio communication mobile station device, communications in the first direction are communications in an uplink direction from the radio communication mobile station device to the radio communication base station device, and communications in the second direction are communications in a downlink direction from the radio communication base station device to the radio communication mobile station device.

The present invention includes, as a twelfth aspect, the radio communication device in which an Ack/Nack resource to transmit an Ack/Nack signal reporting Ack or Nack indicating the decoding result of the reception signal is used as the resource of the control channel in the first direction.

The present invention provides, as a thirteenth aspect, a radio communication method in a radio communication device for transmitting a signal using a resource of a control channel in communications in a first direction from the radio communication device to a communicating device, wherein a control channel in the first direction is configured so that a signal to be transmitted from a plurality of radio communication devices containing other device to the communicating device are code-multiplexed using a code sequence containing an orthogonal sequence and a cyclic-shifted sequence and the code-multiplexed signal is transmitted, and the resources of the control channel in the first direction are set for respective codes of the code sequence and are allocated corresponding to control information reported from the communicating device by communications in a second direction from the communicating device to the radio communication device, the radio communication including the steps of: indicating application of cyclic delay diversity with respect to transmission signals if it is determined that a resource on the right on an axis of a cyclic-shifted amount of the cyclic-shifted sequence in the same orthogonal code of the orthogonal sequence is not used as for the resources allocated to the radio communication device among the resources of the control channel; and transmitting, if the cyclic delay diversity is applied in response to the indication of the cyclic delay diversity, transmission signals to the communicating device through a plurality of antennas using the resource allocated to the radio communication device and at least one unused resource, which are given different cyclic-shifted amounts in the same orthogonal code.

The present invention provides, as a fourteenth aspect, a radio communication method in a radio communication device for receiving a signal sent using a resource of a control channel in communications in a first direction from a communicating device to the radio communication device, wherein a control channel in the first direction is configured so that a signal to be transmitted from a plurality of radio communication devices to the radio communicating device are code-multiplexed using a code sequence containing an orthogonal sequence and a cyclic-shifted sequence and the code-multiplexed signal is transmitted, and the resources of the control channel in the first direction are set for respective codes of the code sequence and are allocated corresponding to control information reported to the communicating device by communications in a second direction from the radio communication device to the communicating device, the radio communication method including the steps of: when executing resource allocation of a communication signal, if cyclic delay diversity for a transmission signal is applied using resources which are given different cyclic-shifted amounts of the cyclic-shifted sequence in the same orthogonal code of the orthogonal sequence in the communicating device as for the control channel in the first direction, executing the resource allocation in which the cyclic delay diversity is considered; and receiving a signal transmitted from the communicating device and performing reception processing containing channel estimation of a transmission path between the communicating device and the radio communication device and demodulation of the reception signal in response to the resource allocation of the control channel in the first direction.

The following configurations are also possible:

A radio communication device for transmitting a signal using a resource of a control channel in communications in a first direction from the radio communication device to a communicating device, wherein a control channel in the first direction is configured so that a signal to be transmitted from a plurality of radio communication devices containing other device to the communicating device are code-multiplexed using a code sequence containing an orthogonal sequence and a cyclic-shifted sequence and the code-multiplexed signal is transmitted, and the resources of the control channel in the first direction are set for respective codes of the code sequence and are allocated corresponding to control information reported from the communicating device by communications in a second direction from the communicating device to the radio communication device, the radio communication device including: a cyclic delay diversity indication section which is configured to indicate application of cyclic delay diversity with respect to transmission signals if it is determined that a resource located on the right on an axis of a cyclic-shifted amount of the cyclic-shifted sequence in the same orthogonal code of the orthogonal sequence is rarely used as for the resources allocated to the radio communication device among the resources of the control channel; and a transmission section which is configured, if the cyclic delay diversity is applied in response to the indication from the cyclic delay diversity indication section, to transmit the transmission signals to the communicating device through a plurality of antennas using the resource allocated to the radio communication device and at least one resource located between the resource and rarely-used resource, which are given different cyclic-shifted amounts in the same orthogonal code.

A radio communication method in a radio communication device for transmitting a signal using a resource of a control channel in communications in a first direction from the radio communication device to a communicating device, wherein a control channel in the first direction is configured so that a signal to be transmitted from a plurality of radio communication devices containing other device to the communicating device are code-multiplexed using a code sequence containing an orthogonal sequence and a cyclic-shifted sequence and the code-multiplexed signal is transmitted, and the resources of the control channel in the first direction are set for respective codes of the code sequence and are allocated corresponding to control information reported from the communicating device by communications in a second direction from the communicating device to the radio communication device, the radio communication including the steps of: indicating application of cyclic delay diversity with respect to transmission signals if it is determined that a resource on the right on an axis of a cyclic-shifted amount of the cyclic-shifted sequence in the same orthogonal code of the orthogonal sequence is rarely used as for the resources allocated to the radio communication device among the resources of the control channel; and transmitting, if the cyclic delay diversity is applied in response to the indication of the cyclic delay diversity, transmission signals to the communicating device through a plurality of antennas using the resource allocated to the radio communication device and at least one resource located between the resource and the rarely-used resource, which are given different cyclic-shifted amounts in the same orthogonal code.

Advantageous Effects of the Invention

According to the invention, there can be provided the radio communication device and the radio communication method that can provide the transmission diversity effect by applying CDD while reducing inter-symbol interference when code multiplex is performed.

BRIEF DESCRIPTION OF THE DRAWINGS

FIG. 3 is a block diagram to show the configuration of the main part of a transmitter used in the first embodiment of the invention.

FIG. 4 is a block diagram to show the configuration of the main part of a receiver used in the first embodiment of the invention.

FIG. 5 shows a delay profile and a frequency response in assignment of the Ack/Nack resource allocation shown in FIG. 1; (A) shows the delay profile and (B) shows the frequency response.

FIG. 6 describes scrambling applied to an Ack/Nack signal.

FIG. 7 shows a resource allocation example in an uplink control channel in a second embodiment of the invention.

DESCRIPTION OF EMBODIMENTS

In present embodiments, configuration examples of a radio communication device and a radio communication method used with a cellular system of a radio communication system for mobile communications are shown as examples of a radio communication device and radio communication method according to the invention. In the configuration examples given below, the configuration for allocating resources to a plurality of mobile stations by performing code multiplex when control information is transmitted using an uplink control channel in an uplink from a mobile station to a base station is illustrated. As the control information, the case of transmitting an Ack/Nack signal for reporting Ack or Nack indicating the decode result of a reception signal in a mobile station is assumed. The embodiments described later are examples for the description and the invention is not limited to the embodiments.

In the embodiments, when an Ack/Nack signal is transmitted from a radio communication device in a user terminal of a mobile station to a radio communication device in a base station in an uplink control channel of an uplink, CDD is applied and each signal is transmitted through a plurality of antennas, whereby transmission diversity is realized. To perform code multiplex in a plurality of user terminals, a code sequence diffused at two stages of a cyclic-shifted sequence based on a CAZAC sequence, etc., and an orthogonal sequence is used. In this case, as described later, the use situation of the corresponding Ack/Nack resource is determined by allocation of a control signal of a downlink control channel or scheduling of each user terminal, etc., so that the resource of each user terminal is allocated accordingly, whereby inter-symbol interference when code multiplex is performed is reduced.

First Embodiment

Figure 1:
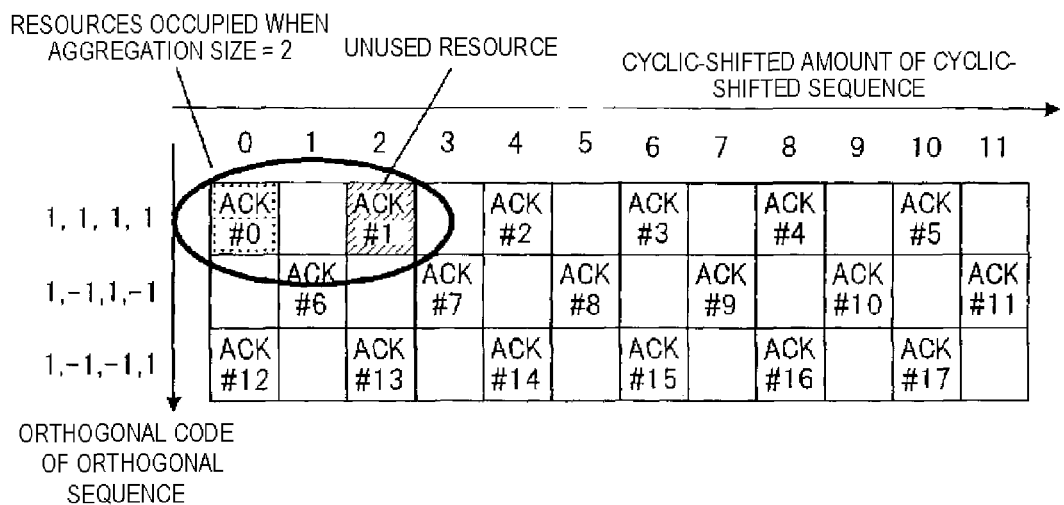
FIG. 1 shows a resource allocation example in an uplink control channel according to a first embodiment of the invention.
Figure 2:
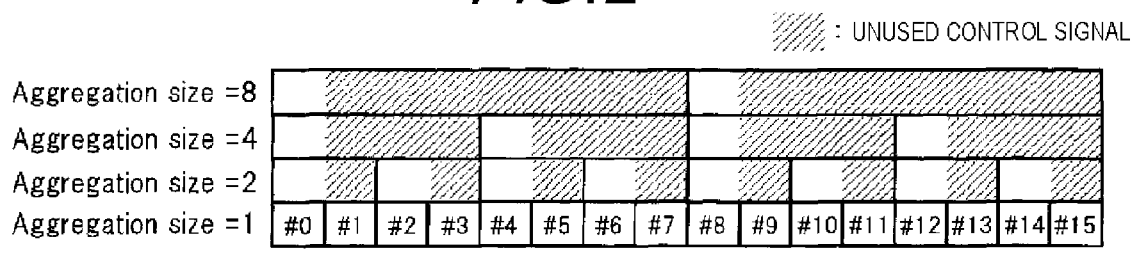
FIG. 2 shows allocation of control signals in a downlink control channel.
Figure 13:
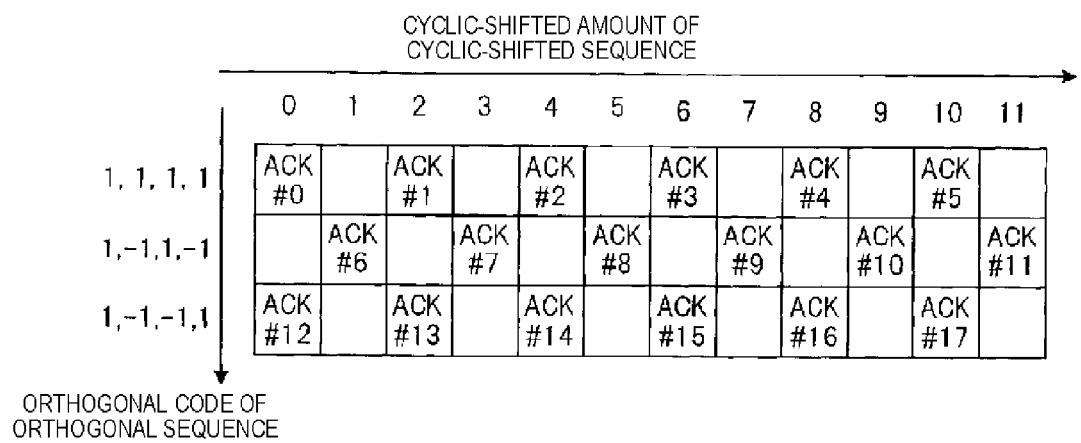
FIG. 13 shows an example of a code sequence used for each user terminal when code multiplex is performed in an uplink control channel.
Figure 14:
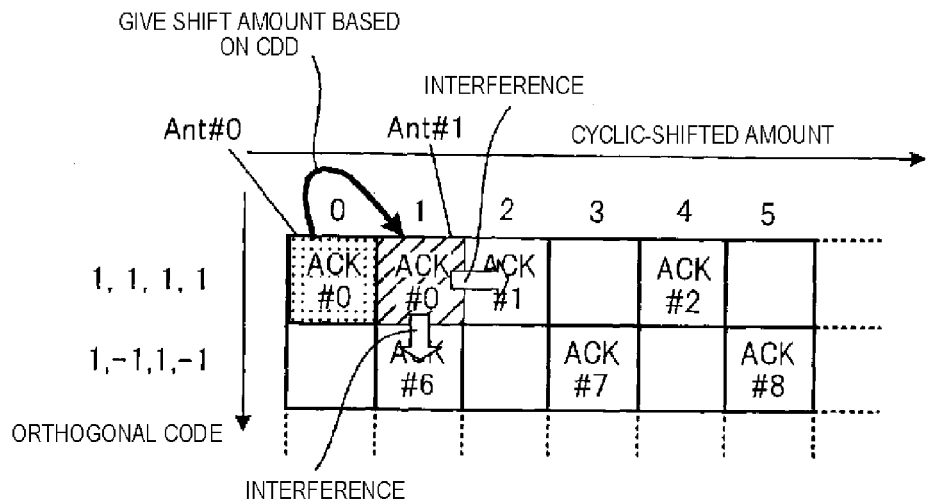
FIG. 14 shows an example of resource allocation when CDD is applied in a code sequence to perform code multiplex as shown in FIG. 13.

FIG. 1 shows a resource allocation example in an uplink control channel according to a first embodiment of the invention. FIG. 2 shows allocation of control signals in a downlink control channel. FIG. 1 shows resource allocation in two code sequences two-dimensionally as a assignment example of code sequences subjected to code multiplex, applied to Ack/Nack resources. In FIG. 1, the horizontal direction indicates the cyclic-shifted amount of a cyclic-shifted sequence based on a CAZAC sequence, and each code sequence having twelve cyclic-shifted amounts of 0 to 11 is set. The vertical direction indicates a plurality of orthogonal codes as an orthogonal sequence. Four-symbol codes (1, 1, 1, 1) (1, −1, 1, −1) (1, −1, −1, 1) . . . are used as the orthogonal codes. Each of ACK#0, ACK#1, . . . is the number of the Ack/Nack resource and indicates the position of the resource allocated to each user terminal. As in the example in FIG. 13, the Ack/Nack resources ACK#0, ACK#1, . . . are allocated to each user terminal in such a manner that they are used at intervals of two cyclic-shifted amounts in the same orthogonal code and are used at interval of one cyclic-shifted amount between the adjacent orthogonal codes, whereby the adjacent resources are not allocated with spacing of one allocated resource in the cyclic-shifted sequence and the orthogonal sequence.

To ensure coverage of a control signal in a downlink control channel, a base station in a cellular system may collectively use control signals of continuous resources for a single user terminal and indicate control information of a down data signal so as to aggregate energy of a transmission signal and cause the signal to arrive at a distant location for the user terminal at a cell edge, for example. Here, the number of control signals used by the base station in the downlink control channel is called aggregation size. That is, the aggregation size indicating the size of resources for down control signals is contained as one of control information used for down resource allocation to each user terminal by the base station. When receiving a downlink control channel, the user terminal searches for the aggregation sizes in order in response to a predetermined combination. The user terminal can find the number of control signals used for the own terminal according to the aggregation size. The control signal in the downlink control channel is also called CCE (Control Channel Element) in LTE; any other control information can be applied in a similar manner if it is the resource for the control signal used for reporting down resource allocation similar to CCE.

As shown in FIG. 2, in the downlink control channel, when aggregation size=1, one control signal #0, #1, . . . is allocated to each user terminal. When aggregation size=2, two control signals are allocated to each user terminal and the control signals used for each user terminal are at intervals of two as #0, #2, . . . . When aggregation size=4, four control signals are allocated to each user terminal and the control signals used for each user terminal are at intervals of four as #0, #4, . . . . When aggregation size=8, eight control signals are allocated to each user terminal and the control signals used for each user terminal are at intervals of eight as #0, #8, . . . In this case, to simplify the allocation rule, the start position of the control signal is limited as described above.

On the other hand, the Ack/Nack resources in the uplink control channel are allocated corresponding to the start position of the control signal of the downlink control channel and the aggregation size. When aggregation size=1, each Ack/Nack resource is used as ACK#0, ACK#1, . . . . When aggregation size=2, the Ack/Nack resources are used at intervals of two as ACK#0, ACK#2, . . . . When aggregation size=4, the Ack/Nack resources are used at intervals of four as ACK#0, ACK#4, . . . . When aggregation size=8, the Ack/Nack resources are used at intervals of eight as ACK#0, ACK#8, . . . . Thus, when aggregation size >1, unused Ack/Nack resources occur. The situation when the aggregation size becomes large is a situation in which the communication environment is bad as the user terminal is at a distance from the base station. The user terminal, particularly in such a case, needs the transmission diversity effect in an uplink. To apply MIMO (Multiple Input Multiple Output) in a down link, a large information amount becomes necessary to represent Ack/Nack of a plurality of data strings to be transmitted and thus transmission diversity in an uplink is effective.

In the embodiment, when the aggregation size is larger than 1, namely, is 2 or more, the user terminal executes transmission according to CDD using the cyclic-shifted amount corresponding to different Ack/Nack resource in the same orthogonal code, of the corresponding Ack/Nack resources. That is, if there is an unused Ack/Nack resource corresponding to the control signal of the down link, the user determines the effect according to the aggregation size and allocates resources of a plurality of antennas for CDD using the unused Ack/Nack resource. Specifically, as shown in FIG. 1, for example, when aggregation size=2, one user terminal occupies two resources of ACK#0 and ACK#1 as surrounded by an ellipse in the figure and when CDD is not executed, second ACK#1 becomes an unused resource. Then, the resource of ACK#0 of cyclic-shifted amount 0 is allocated to the first antenna and the resource of ACK#1 of cyclic-shifted amount 2 is allocated to the second antenna. The resources are allocated to the code sequence, whereby CDD cyclically shifting in the same code sequence is applied and the transmission diversity effect is provided and when CDD is applied, interference with the code allocated to a different user terminal can be eliminated.

In this way, in the embodiment, the transmitter in the uplink (namely, the user terminal) uses the resource corresponding to the control information used for reporting down resource allocation to the own terminal in transmission of an Ack/Nack signal and executes transmission from a plurality of antennas using cyclic-shifted sequence of different cyclic-shifted amount in the same orthogonal code, of code sequence used to diffuse the transmission signal for code multiplex between user terminals, thereby performing transmission diversity processing according to CDD. In this case, if it is determined that the resources located at the right side in the axis of the cyclic-shifted amount contain an unused resource, the unused resource is used to perform CDD transmission. On the other hand, the receiver (namely, the base station) assumes a transmission signal generated by applying CDD in the user terminal, executes resource allocation to each user terminal, and demodulates the signal transmitted from the user terminal by the reception operation corresponding to the CDD described above.

The configuration and the operation of the embodiment will be described below in more detail: FIG. 3 is a block diagram to show the configuration of the main part of a transmitter used in the first embodiment of the invention, and FIG. 4 is a block diagram to show the configuration of the main part of a receiver used in the first embodiment of the invention.

The embodiment assumes the case where radio communications are conducted using a radio wave between the transmitter shown in FIG. 3 and the receiver shown in FIG. 4. Here, it is assumed that the receiver shown in FIG. 4 is applied to a radio communication base station device (radio base station, BS) in a cellular system and the transmitter shown in FIG. 3 is applied to a user terminal (UE) of a radio communication mobile station device such as a mobile telephone.

The embodiment assumes the case where radio communications are conducted using a radio wave between the transmitter shown in FIG. 3 and the receiver shown in FIG. 4. Here, it is assumed that the receiver shown in FIG. 4 is applied to a radio communication base station device (radio base station, BS) in a cellular system and the transmitter shown in FIG. 3 is applied to a user terminal (UE) of a radio communication mobile station device such as a mobile telephone.

The transmitter (user terminal) shown in FIG. 3 includes a plurality of transmission signal generation sections 301*a* and 301*b*, a plurality of transmission RF sections 302*a* and 302*b*, a plurality of antennas 303*a* and 303*b*, a reception RF section 304, a control signal demodulation section 305, a data demodulation section 306, an error correction decode section 307, a CRC detection section 308, an Ack/Nack signal generation section 309, a subcarrier assignment indication section 310, an aggregation size retention section 311, a cyclic-shifted sequence indication section 312, and an S/P conversion section 313. Each of the transmission signal generation sections 301*a* and 301*b* includes a cyclic-shifted sequence multiplication section 321, a subcarrier assignment section 322, an IFFT section 323, a P/S conversion and CP giving section 324, and a diffusion section 325.

The receiver shown in FIG. 4 (base station) includes an antenna 431, a reception RF and FFT section 432, a channel estimation section 433, a frequency domain equalizing section (FDE) 434, an IDFT section 435, an inverse diffusion section 436, an Ack/Nack demodulation section 437, a resource allocation section 438, an encoding and demodulation section 439, a control signal generation section 440, a multiplex section 441, and a transmission RF section 442.

In the configuration described above, the user terminal receives a high frequency signal of a downlink containing a control signal transmitted by radio from the base station at the antenna 303*a* and converts the signal into a signal of a comparatively-low frequency band such as a base band signal in the reception RF section 304. The control signal demodulation section 305 demodulates a control signal indicated from the base station, of the reception signal, takes out control information of the demodulation system, the encoding ratio, etc., used for the data transmitted to the own terminal, demodulates the data, and determines an Ack/Nack resource used for an Ack/Nack signal.

The user terminal demodulates data sent from the base station, of the reception signal by the data demodulation section 306 and performs error correction decode processing for the demodulated reception signal by the error correction decode section 307 to decode original data. The user terminal determines the decode result of the reception data by performing CRC by the CRC detection section 308. If the CRC detection result is OK, a reception data sequence is output and generates a response signal of Ack by assuming that the signal can be demodulated with no error. If the CRC detection result is NG, a response signal of Nack is generated by assuming that the signal cannot be demodulated.

For determination of the Ack/Nack resource in the control signal demodulation section 305, the resource allocated to the own terminal is determined based on control information transmitted from the base station. Specifically, the number of the detected control signal and the Ack/Nack resource shown in FIG. 1 are previously associated with each other and it is determined that the Ack/Nack signal is transmitted using the resource corresponding to the number of the control signal that can be demodulated.

At this time, the user terminal detects the aggregation size of the downlink control channel from the base station to the own terminal as the control information used for reporting down resource allocation and uses it for transmission diversity control when transmitting the Ack/Nack signal of the own terminal. Specifically, in the control signal demodulation section 305, subcarrier assignment information of the Ack/Nack resource and information of the aggregation size, the subcarrier assignment information is output from the control signal demodulation section 305 to the subcarrier assignment indication section 310, and the information of the aggregation size is output to the aggregation size retention section 311.

The aggregation size retention section 311 indicates the cyclic-shifted sequence corresponding to the Ack/Nack resource allocated to each antenna toward the cyclic-shifted sequence indication section 312 when the own terminal transmits the Ack/Nack signal. Specifically, when the aggregation size is larger than 1, as shown in FIG. 1, the cyclic-shifted sequence of shift amount 0 is allocated to transmission antenna #0 of the first antenna 303a and the cyclic-shifted sequence of shift amount 2 is allocated to transmission antenna #1 of the second antenna 303b. On the other hand, when the aggregation size is 1, transmission antenna #1 is commanded so as not to transmit a signal through the cyclic-shifted sequence indication section 312.

The Ack/Nack signal generated in the Ack/Nack signal generation section 309 is subjected to serial-parallel conversion in the S/P conversion section 313 and each is input to the transmission signal generation sections 301a and 301b to generate a transmission signal. In each of the transmission signal generation sections 301a and 301b, the cyclic-shifted sequence multiplication section 321 performs multiplication processing of the cyclic-shifted sequence responsive to indication from the cyclic-shifted sequence indication section 312, and the subcarrier assignment section 322 places the data symbol corresponding to each subcarrier of the uplink control channel based on indication from the subcarrier assignment indication section 310. The IFFT section 323 transforms each transmission symbol into a time domain signal by inverse fast Fourier transform (IFFT). Next, the P/S conversion and CP giving section 324 converts a parallel signal into a serial signal and then gives CP (Cyclic Prefix). The diffusion section 325 multiplies by the orthogonal code corresponding to the resource allocated to the own terminal, performs diffusion processing based on the cyclic-shifted sequence and the orthogonal sequence, and executes code multiplex between the user terminals. Then, each of the transmission RF sections 302a and 302b converts a transmission signal of a base band signal into a high frequency signal and performs power amplification and then outputs the signal as a radio wave for radio transmission from the antenna 303a, 303b and transmits the radio wave to the base station of the communicating station. Accordingly, in the uplink from the user terminal to the base station, transmission of the Ack/Nack signal, etc., in the uplink control channel is performed.

In the configuration described above, the aggregation size retention section 311 and the cyclic-shifted sequence indication section 312 realize the function of a cyclic delay diversity indication section. The control signal demodulation section 305 and the aggregation size retention section 311 realize the function of a second direction control information acquisition section. The cyclic-shifted sequence multiplication sections 321, the subcarrier assignment sections 322, the IFFT sections 323, the P/S conversion and CP giving sections 324, and the diffusion sections 325 of the transmission signal generation sections 301a and 301b, the transmission RF sections 302a and 302b, and the antennas 303a and 303b realize the function of a transmission function.

On the other hand, the receiver (base station) shown in FIG. 4 transmits transmission data and a control signal to the user terminal in the downlink before reception of the Ack/Nack signal from the user terminal in the uplink described above. At the time, the resource allocation section 438 executes resource allocation to each user terminal and based on the resource allocation, the encoding and demodulation section 439 performs encoding and modulation processing of transmission data and the control signal generation section 440 generates a control signal. The multiplex section 441 performs multiplex processing of the transmission data and the control signal. The transmission RF section 442 converts the transmission signal into a high frequency signal of a predetermined radio frequency band and performs power amplification and then outputs the signal as a radio wave for radio transmission from the antenna 431 and transmits the radio wave to the user terminal of the communicating station. The control signal is transmitted according to a predetermined aggregation size in the downlink control channel.

The base station receives the high frequency signal of the uplink containing the Ack/Nack signal transmitted by radio from the user terminal at the antenna 431 and converts the signal into a signal of a comparatively low band such as a baseband signal by the reception RF and FFT section 432 and then transforms the reception signal into a frequency domain signal by fast Fourier transform (FFT). The base station performs reception processing by assuming a cyclic-shifted sequence used for an Ack/Nack signal from the user terminal based on the control signal reported to the user terminal. Specifically, the resource allocation section 438 reports the Ack/Nack resource corresponding to the control signal and the aggregation size of the control signal to the channel estimation section 433 and which cyclic-shifted sequence the user terminal uses to transmit the Ack/Nack signal is understood and then the reception operation is performed.

At this time, the channel estimation section 433 uses the cyclic-shifted sequence assumed to be used in the user terminal and acquires a channel estimation value of the uplink control channel from the user terminal. The frequency domain equalizing section 434 inputs a data symbol of the reception signal and performs processing of frequency domain equalizing for a frequency response obtained from the channel estimation value. Then, the IDFT section 435 transforms data into a time domain signal by inverse discrete Fourier transform (IDFT). The inverse diffusion section 436 performs inverse diffusion processing for obtained reception data using the cyclic-shifted sequence and the orthogonal code allocated to the user terminal, and the Ack/Nack demodulation section 437 demodulates the Ack/Nack signal.

In the configuration described above, the antenna 431, the reception RF and FFT section 432, the channel estimation section 433, the frequency domain equalizing section 434, the IDFT section 435, the inverse diffusion section 436, and the Ack/Nack demodulation section 437 realize the function of a reception section.

Here, FIG. 5 shows an example of a transmission characteristic when Ack/Nack resource allocation in the embodiment is performed. FIG. 5 shows a delay profile and a frequency response in assignment of the Ack/Nack resource allocation shown in FIG. 1; (A) shows the delay profile and (B) shows the frequency response. In (A) of FIG. 5, the horizontal axis indicates time t and the vertical axis indicates channel gain |h|. In (B) of FIG. 5, the horizontal axis indicates frequency f and the vertical axis indicates channel gain |h| and the frequency response in units of one resource block is shown.

The base station of the reception side can extract a signal from transmission antenna #0 (Ant#0) of the user terminal and a signal from transmission antenna #1 (Ant#1) of the user terminal and can combine them to demodulate the Ack/Nack signal. At this time, cyclic-shifted sequences are used at intervals of two and thus inter-symbol interference can be reduced and if a signal delay occurs due to fading, etc., in a propagation path, giving interference to a signal component from a different user terminal is small. The user terminal detects that the Ack/Nack resource allocated to the own terminal is a cyclic-shifted sequence of cyclic-shifted amount 0 and that aggregation size=2, whereby the user terminal finds that cyclic-shifted amount 2 of the adjacent Ack/Nack resource is not used for a different user terminal. Thus, if the own terminal uses the amount, a signal can be transmitted without giving interference to the different user terminal. The signal is transmitted as a cyclically shifted signal of the same orthogonal code, whereby the transmission becomes equivalent to CDD transmission and the transmission diversity effect is provided by the frequency response of a composite channel as shown by (B) in FIG. 5. That is, the frequency selectivity of a signal transmitted from the user terminal to the base station is enhanced, the diversity effect of space-frequency can be provided, and the reliability of a transmission signal in a single user terminal can be improved.

In the first embodiment, when the Ack/Nack signal is transmitted in the uplink control channel from the user terminal to the base station, the user terminal acquires the aggregation size indicating the number of control signals used in the downlink control channel from the base station to the user terminal. When the aggregation size is larger than 1, the user terminal determines that the resource adjacent to the right side on the axis of the cyclic-shifted amount of the cyclic-shifted sequence in the same orthogonal code is not used, and executes transmission to which CDD is applied through a plurality of antennas using the resource of a different cyclic-shifted amount in the same orthogonal code. Accordingly, the transmission diversity effect can be provided and an unused resource on the right in the cyclic-shifted amount at the time is used, whereby inter-symbol interference with the resource allocated to the different user terminal can be reduced.

Second Embodiment

A second embodiment of the invention is provided by changing a part of the operation of the first embodiment and is an example wherein scramble is applied to the Ack/Nack signal. FIG. 6 describe scrambling applied to the Ack/Nack signal and FIG. 7 shows a resource allocation example in an uplink control channel in the second embodiment of the invention.

In the second embodiment, to further reduce interference, scramble dependent on a cyclic-shifted sequence is applied to the Ack/Nack signal as in FIG. 6. In the example in FIG. 6, even-numbered Ack/Nack signals ACK#0, ACK#2, ... are as they are, and odd-numbered Ack/Nack signals ACK#1, ACK#3, ... are subjected to phase rotation of 90 degrees for shifting the phase 90 degrees between the adjacent Ack/Nack signals. In the figure, RS denotes a reference signal.

The scramble as described above is applied, the resource of ACK#0 of cyclic-shifted amount 0 is allocated to the first antenna, and the resource of ACK#1 of cyclic-shifted amount 1 is allocated to the second antenna. Further, in the embodiment, to apply the scramble, as shown in FIG. 7, when Ack/Nack signals are generated, scramble corresponding to the rightmost signal on the axis of the cyclic-shifted amount in the continuously allocated resources (here, ACK#1 of cyclic-shifted amount 2) is used and is applied to all diversity-transmitted signals in CDD. In this case, the same scramble as ACK#1 rather than essential scramble is applied to ACK#0 of cyclic-shifted amount 0. In FIG. 7, a pair of Ack/Nack resources used to perform CDD transmission is represented as the same ACK#1.

In radio communications, a signal delay may occur depending on the situation of a propagation path such as fading, but proceeding on a time axis scarcely occurs. The cyclic-shifted amount of the cyclic-shifted sequence can also assumed to be a delay when it is seen on the time axis. To reduce interference given to a different Ack/Nack resource, it is effective to consider the effect on the right resource in the cyclic-shifted amount corresponding to a delay on the time axis. Therefore, in the embodiment, scramble is made different between the rightmost Ack/Nack resource on the axis of the cyclic-shifted amount in the Ack/Nack resources allocated to the own terminal and the Ack/Nack resources allocated to the different user terminal on the right to the own terminal, so that the furthermore interference reduction effect is provided.

Figure 8:
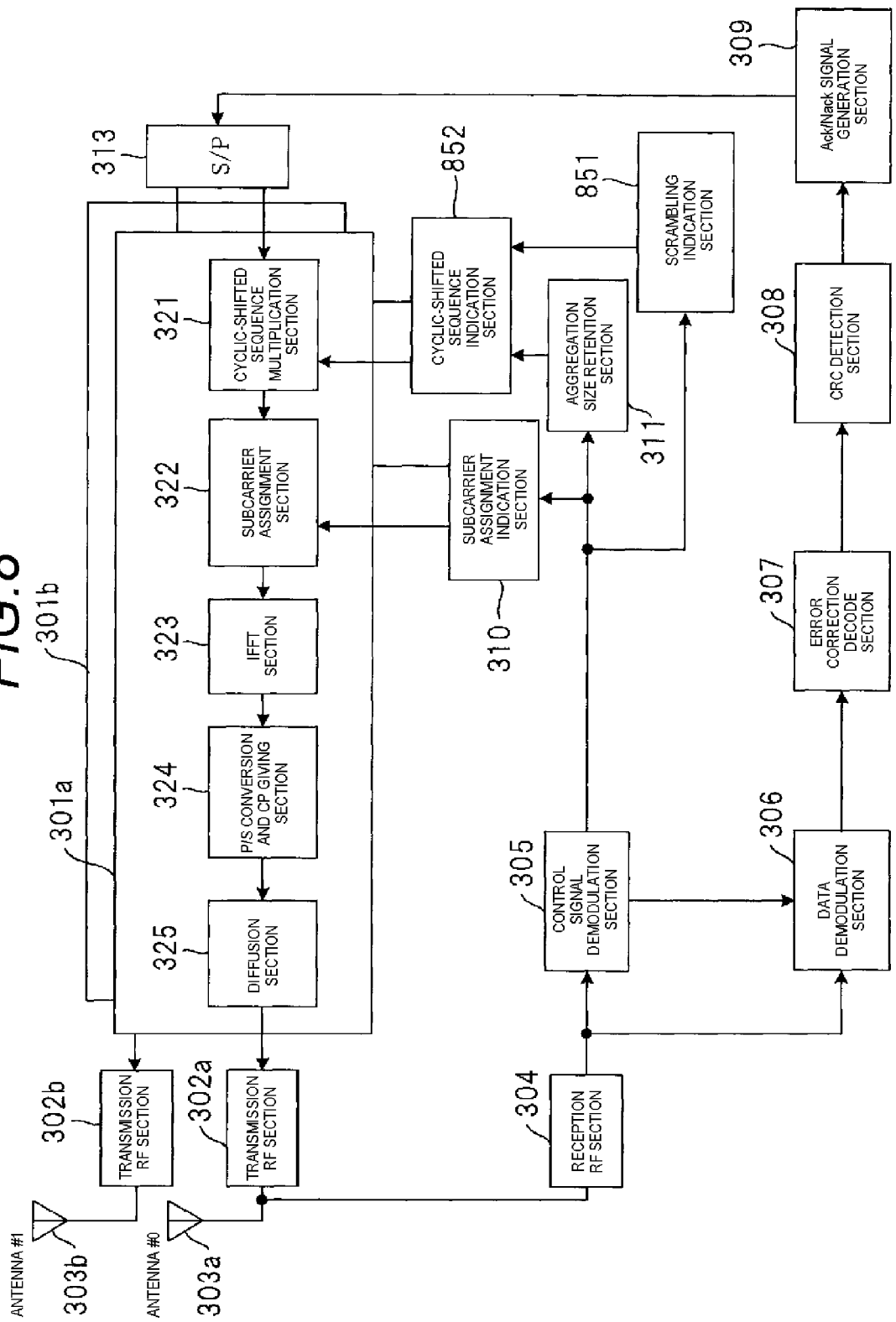
FIG. 8 is a block diagram to show the configuration of the main part of a transmitter used in the second embodiment of the invention.
Figure 9:
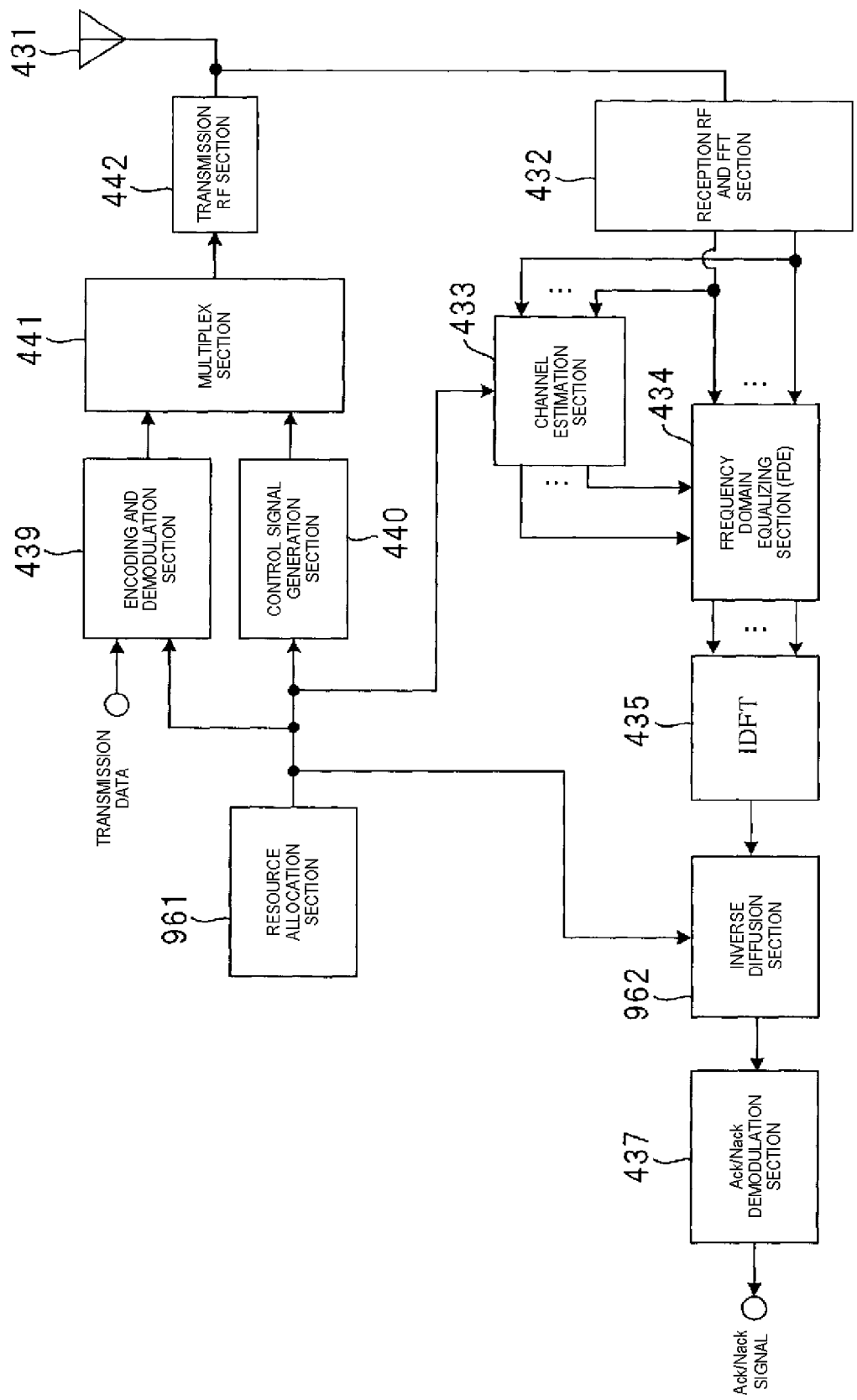
FIG. 9 is a block diagram to show the configuration of the main part of a receiver used in the second embodiment of the invention.

FIG. 8 is a block diagram to show the configuration of the main part of a transmitter used in the second embodiment of the invention, and FIG. 9 is a block diagram to show the configuration of the main part of a receiver used in the second embodiment of the invention. Components similar to those of the first embodiment shown in FIGS. 3 and 4 are denoted by the same reference numerals in FIGS. 8 and 9. Only differences from the first embodiment will be described.

The transmitter (user terminal) shown in FIG. 8 includes a scrambling indication section 851 and differs from that of the first embodiment in a part of the function of a cyclic-shifted sequence indication section 852. The scrambling indication section 851 inputs aggregation size and scrambling information from a control signal demodulated by a control signal demodulation section 305 and indicates scrambling corresponding to the Ack/Nack resource allocated to each antenna for the cyclic-shifted sequence indication section 852. At this time, the scrambling indication section 851 indicates scramble corresponding to the rightmost resource on the axis of cyclic-shifted amount, of the Ack/Nack resources to the user terminal. The cyclic-shifted sequence indication section 852 outputs cyclic-shifted sequence and scrambling information to a cyclic-shifted sequence multiplication section 321 based on the cyclic-shifted sequence indicated from an aggregation size retention section 311 and scramble indicated from the scrambling indication section 851 and commands the cyclic-shifted sequence multiplication section 321 to perform multiplication of the cyclic-shifted sequence and processing of scrambling. The cyclic-shifted sequence multiplication section 321 and a diffusion section 325 perform scramble processing dependent on the cyclic-shifted amount of the cyclic-shifted sequence based on the indication and the command. In the configuration, the cyclic-shifted sequence multiplication sections 321 and the diffusion sections 325 of transmission signal generation sections 301a and 301b realize the function of a scramble processing section.

The receiver (base station) differs from that of the first embodiment in a part of the functions of a resource allocation section 961 and an inverse diffusion section 962. To allocate resources to the user terminals, the resource allocation section 961 sets scramble of Ack/Nack resources and outputs scrambling information to the inverse diffusion section 962. The inverse diffusion section 962 assumes scramble used for the Ack/Nack signal from the user terminal based on the scrambling information and performs inverse diffusion processing. In the configuration, the inverse diffusion section 962 realizes the function of an inverse scramble processing section.

According to the configuration of the second embodiment described above, scramble corresponding to the rightmost resource on the axis of the cyclic-shifted amount in a code sequence is applied, so that scramble becomes different from the resource to a different user terminal to the right of the user terminal in the cyclic-shifted amount corresponding to the immediately following resource on the time axis to which the effect of a signal delay is easily given because of fading, etc., and thus inter-symbol interference can be further reduced. Therefore, to apply transmission diversity based on CDD, if the used code sequence is cyclically shifted, the effect of the scramble makes it possible to prevent interference with the code sequence allocated to a different user terminal. The transmission diversity based on CDD can be applied without affecting an existing Ack/Nack resource allocation method containing the scramble.

Third Embodiment

Figure 10:
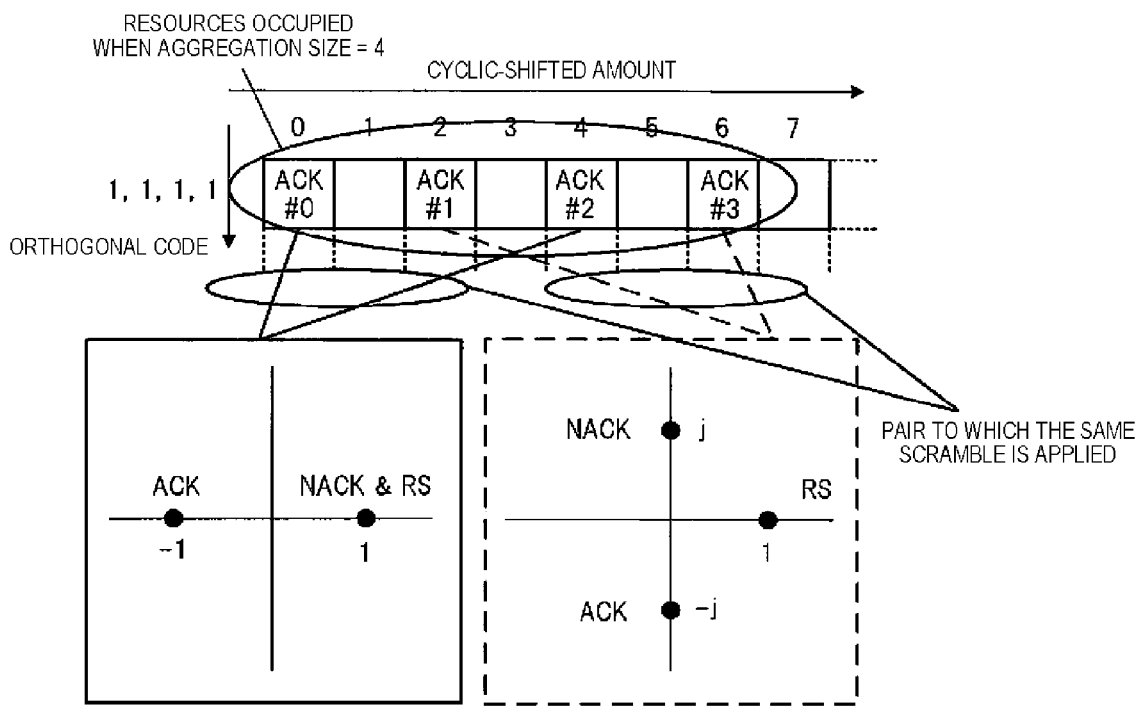
FIG. 10 shows scrambling in which a pair to which the same scramble is applied in an Ack/Nack signal exists.

A third embodiment of the invention is a modified example of the second embodiment and is an application example of scramble to an Ack/Nack signal when aggregation size=4, 8. FIG. 10 shows scrambling wherein a pair to which the same scramble is applied in an Ack/Nack signal exists, and FIG. 11 shows a resource allocation example in an uplink control channel according to the third embodiment of the invention.

In the third embodiment, as in the second embodiment, scramble dependent on a cyclic-shifted sequence is applied to the Ack/Nack signal as in FIG. 6. As shown in FIG. 10, when aggregation size=4, 8, Ack/Nack resources are allocated to a user terminal at intervals of four or eight and thus a pair to which the same scramble with the same constellation is applied always exists in the user terminal. Then, in the embodiment, CDD transmission is executed using a pair to which the same scramble is applied, as shown in FIG. 11. In this case, scramble becomes different from the resource to a different user terminal to the right of the user terminal corresponding to the immediately following resource on the time axis.

Figure 11:
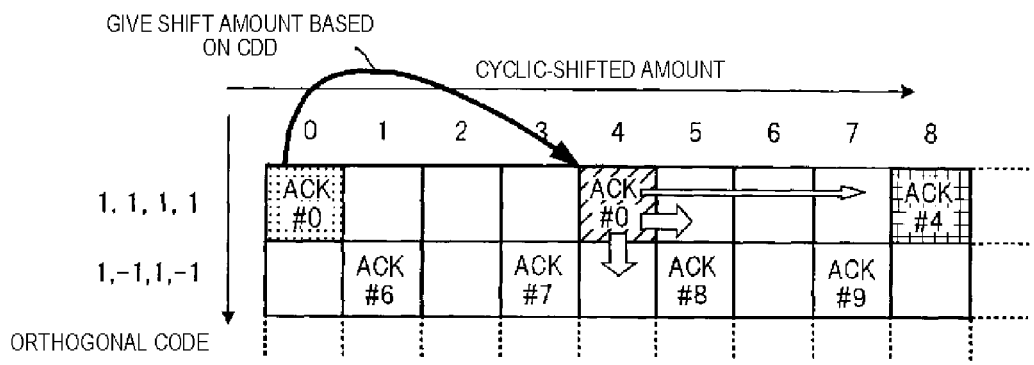
FIG. 11 shows a resource allocation example in an up channel according to a third embodiment of the invention.

In the example in FIG. 11, when aggregation size=4, the resource of ACK#0 of cyclic-shifted amount 0 is allocated to a first antenna and the resource of ACK#2 of cyclic-shifted amount 4 with the same scramble is allocated to a second antenna. Scramble corresponding to the resources ACK#0 and ACK#2 is applied. In FIG. 11, a pair of Ack/Nack resources used to perform CDD transmission is represented as the same ACK#0. In this case, the resources of ACK#1 and ACK#3 of the same scramble can also be used; however, considering the rule of Ack/Nack resource allocation, originally allocated ACK#0 and ACK#2 of the same scramble as ACK#0 are used. When aggregation size=8, any other combination than the combination of ACK#0 and ACK#2 is also possible. However, if the cyclic-shifted amount in CDD transmission is taken largely, selectivity becomes too strong and energy is lost. Thus, practically it is preferred to use the resources of ACK#0 and ACK#2 of the same scramble and small in the difference of the cyclic-shifted amount.

According to the configuration of the third embodiment described above, to apply transmission diversity based on CDD, if the used code sequence is cyclically shifted, the effect of the scramble makes it possible to prevent interference with the code sequence allocated to a different user terminal, and inter-symbol interference can be reduced.

Fourth Embodiment

Figure 12:
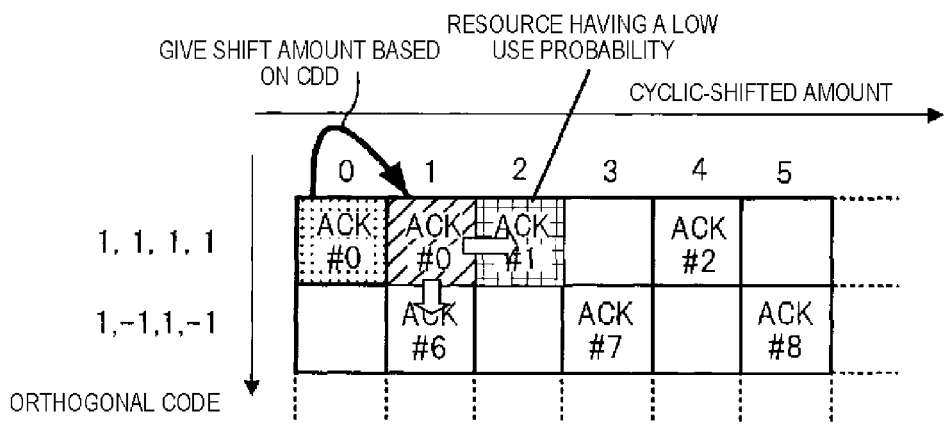
FIG. 12 shows a resource allocation example in an uplink control channel according to a fourth embodiment of the invention.

A fourth embodiment of the invention is an example wherein the technical idea of the first embodiment is expanded, CDD transmission is executed using an Ack/Nack resource corresponding to a control signal having a small allocation probability, and transmission diversity is realized. FIG. 12 shows a resource allocation example in an uplink control channel according to the fourth embodiment of the invention.

The fourth embodiment assumes that aggregation size=1. In this case, to apply CDD, the resource of cyclic-shifted amount 0 and the adjacent resource of cyclic-shifted amount 1 must be used. On the other hand, as shown in FIG. 2, paying attention to control signal numbers that can be taken in each aggregation size (=1, 2, 4, 8), control signals having a small allocation probability exist. Specifically, control signals of #0 and #8 are used in every aggregation size; while, odd-numbered control signals of #1, #3, etc., are used only when aggregation size=1.

Then, a user terminal of the fourth embodiment executes CDD transmission only when a control signal of "resource having a low use probability" is allocated to the resource on the right on the axis of cyclic-shifted amount in Ack/Nack resources. That is, if it is determined that the probability that the resource on the right on the axis of cyclic-shifted amount in the same orthogonal code will be used is low, transmission diversity processing based on CDD is performed using the Ack/Nack resource essentially allocated to the own terminal and a resource between that resource and the resource having a low use probability.

According to the configuration of the fourth embodiment, to apply the transmission diversity based on CDD, interference that can occur when the used code sequence is cyclically shifted can be circumvented stochastically, and inter-symbol interference can be reduced.

In the embodiments described above, the Ack/Nack resources are shown as the resources used in the uplink control channel, but the invention is not limited to the mode. If information is information transmitted using the uplink control channel corresponding to down control information, the invention can also be applied to any other signal resource.

In the embodiments described above, the example applied to the uplink from the mobile station to the base station in the cellular system is shown, but the invention can also be applied to various radio communication systems as required if communication systems can be applied.

It is to be understood that the invention is not limited to the items shown in the embodiments described above and the invention is also intended for those skilled in the art to make modifications and application based on the Description of the invention and well-known arts and the modifications and the application are contained in the scope to seek protection. The components in the embodiments may be combined as desired without departing from the spirit and the scope of the invention.

Although the antenna is described in the embodiments, the embodiments can also be applied to an antenna port in a similar manner. The antenna port refers to a logical antenna made up of one or two or more physical antennas. That is, the antenna port does not necessarily mean one physical antenna and may mean an array antenna, etc., made up of two or more antennas. For example, in LTE, how many physical antennas an antenna port is made up of are not defined and the antenna port is defined as the minimum unit in which the base station can transmit a different reference signal. The antenna port may be defined as the minimum unit in which weight of a precoding vector is multiplied.

The embodiments have been described by taking the case where the invention is embodied by hardware as an example, but the invention can also be implemented by software.

Each of the function blocks used in the description of the embodiments is implemented typically as an LSI of an integrated circuit. The function blocks may be put individually into one chip or may be put into one chip so as to contain some or all. Here, the integrated circuit is an LSI, but may be called an IC, a system LSI, a super LSI, or an ultra LSI depending on the difference in integration degree.

The technique of putting into an integrated circuit is not limited to an LSI and it may be implemented as a dedicated circuit or a general-purpose processor. An FPGA (Field Programmable Gate Array) that can be programmed after LSI is manufactured or a reconfigurable processor wherein connection and setting of circuit cells in LSI can be reconfigured may be used.

Further, if a technology of putting into an integrated circuit replacing LSI appears with the progress of the semiconductor technology or another deriving technology, the function blocks may be integrated using the technology, of course. There can be a possibility of applying a biotechnology, etc.

This application is based on Japanese Patent Application (No. 2008-280230) filed on Oct. 30, 2008, which is incorporated herein by reference.

INDUSTRIAL APPLICABILITY

The invention has the effect of making it possible to provide the diversity effect by applying CDD while reducing inter-symbol interference when code multiplex is performed, and is useful as a radio communication device, a radio communication method, etc., that can be applied to a radio communication system of a cellular system, etc.

REFERENCE SIGNS LIST 301a, 301b Transmission signal generation section
302a, 302b Transmission RF section
303a, 303b Antenna
304 Reception RF section
305 Control signal demodulation section
306 Data demodulation section
307 Error correction decode section
308 CRC detection section
309 Ack/Nack signal generation section
310 Subcarrier assignment indication section 310
311 Aggregation size retention section
312, 852 Cyclic-shifted sequence indication section
313 S/P conversion section
321 Cyclic-shifted sequence multiplication section
322 Subcarrier assignment section
323 IFFT section
324 P/S conversion and CP giving section
325 Diffusion section
431 Antenna
432 Reception RF and FFT section
433 Channel estimation section
434 Frequency domain equalizing section (FDE)
435 IDFT section
436, 962 Inverse diffusion section
437 Ack/Nack demodulation section
438, 961 Resource allocation section
439 Encoding and demodulation section
440 Control signal generation section
441 Multiplex section
442 Transmission RF section
851 Scrambling indication section

The invention claimed is:

1. A transmitting apparatus comprising:
a cyclically shifted sequence multiplying section configured to multiply a response signal with a cyclically shifted sequence defined by a cyclic shift value among a plurality of cyclic shift values;
a spreading section configured to spread the multiplied response signal with an orthogonal sequence among a plurality of orthogonal sequences, wherein the orthogonal sequence and the cyclic shift value are determined from a resource index, and the resource index is associated with a control channel element (CCE) number which indicates a number of a first CCE of one or more CCEs used to transmit a control signal in a downlink control channel; and
a transmitter that transmits the spread response signal using one or more antenna ports, wherein when a first antenna port and a second antenna port are used, said transmitter uses a first orthogonal sequence and a first cyclic shift value that are determined by a first resource index for the spread response signal transmitted using the first antenna port, and uses a second orthogonal sequence and a second cyclic shift value that are determined by a second resource index for the spread response signal transmitted using the second antenna port, the second resource index being a number which equals the first resource index plus one.

2. The transmitting apparatus according to claim 1, wherein the cyclic shift value determined from the first resource index and the cyclic shift value determined from the second resource index are next to each other at a set interval.

3. The transmitting apparatus according to claim 1, wherein the orthogonal sequence determined from the first resource index is same as the orthogonal sequence determined from the second resource index.

4. The transmitting apparatus according to claim 1, wherein:
six cyclic shift values with #0, #2, #4, #6, #8 and #10 among twelve cyclic shift values, which are represented by consecutive numbers #0 to #11 in a direction in which a cyclic shift value is incremented by a set value, are associated with one of the plurality of orthogonal sequences; and
two cyclic shift values, numbers of which are different by two, among the six cyclic shift values are determined from the first resource index and the second resource index, respectively.

5. The transmitting apparatus according to claim 4, wherein six cyclic shift values with #1, #3, #5, #7, #9 and #11 among the twelve cyclic shift values, are associated with another of the plurality of orthogonal sequences.

6. The transmitting apparatus according to claim 1, further comprising:
a scrambling section configured to scramble the spread response signal according to the first or second resource index.

7. The transmitting apparatus according to claim 1, further comprising:
a scrambling section configured to scramble the spread response signal depending on the cyclic shift value determined from the first or second resource index.

8. The transmitting apparatus according to claim 7, further comprising:
   a scrambling section configured to scramble the spread response signal such that a phase of a response signal, for which one of two cyclic shift values that are associated with one of the plurality of orthogonal sequences and that are next to each other at a set interval is used, is rotated by 90 degree with respect to a phase of the other spread response signal, for which the other of two cyclic shift values is used.

9. The transmitting apparatus according to claim 1, further comprising:
   a scrambling section configured to scramble the spread response signal such that a phase of a response signal, for which the first resource index is used, is same as a phase of another response signal, for which the second resource index is used.

10. A response signal transmitting method comprising:
   multiplying a response signal with a cyclically shifted sequence defined by a cyclic shift value among a plurality of cyclic shift values;
   spreading the multiplied response signal with an orthogonal sequence among a plurality of orthogonal sequences, wherein the orthogonal sequence and the cyclic shift value is determined from a resource index, and the resource index is associated with a control channel element (CCE) number which indicates a number of a first CCE of one or more CCEs used to transmit a control signal in a downlink control channel; and
   transmitting the spread response signal using one or more antenna ports, wherein when a first antenna port and a second antenna port are used, a first orthogonal sequence and a first cyclic shift value that are determined by a first resource index are used for the spread response signal transmitted using the first antenna port, and a second orthogonal sequence and a second cyclic shift value that are determined by a second resource index are used for the spread response signal transmitted using the second antenna port, the second resource index being a number which equals the first resource index plus one.

11. The response signal transmitting method according to claim 10, wherein the cyclic shift value determined from the first resource index and the cyclic shift value determined from the second resource index are next to each other at a set interval.

12. The response signal transmitting method according to claim 10, wherein the orthogonal sequence determined from the first resource index is same as the orthogonal sequence determined from the second resource index.

13. The response signal transmitting method according to claim 10, wherein:
   six cyclic shift values with #0, #2, #4, #6, #8 and #10 among twelve cyclic shift values, which are represented by consecutive numbers #0 to #11 in a direction in which a cyclic shift value is incremented by a set value, are associated with one of the plurality of orthogonal sequences; and
   two cyclic shift values, numbers of which are different by two, among the six cyclic shift values are determined from the first resource index and the second resource index, respectively.

14. The response signal transmitting method according to claim 13, wherein six cyclic shift values with #1, #3, #5, #7, #9 and #11 among the twelve cyclic shift values, are associated with another of the plurality of orthogonal sequences.

15. The response signal transmitting method according to claim 10, further comprising:
   scrambling the spread response signal according to the first or second resource index.

16. The response signal transmitting method according to claim 10, further comprising:
   scrambling the spread response signal depending on the cyclic shift value determined from the first or second resource index.

17. The response signal transmitting method according to claim 16, further comprising:
   scrambling the spread response signal such that a phase of a response signal, for which one of two cyclic shift values that are associated with one of the plurality of orthogonal sequences and that are next to each other at a set interval is used, is rotated by 90 degree with respect to a phase of the other spread response signal, for which the other of two cyclic shift values is used.

18. The response signal transmitting method according to claim 10, further comprising:
   scrambling the spread response signal such that a phase of a response signal, for which the first resource index is used, is same as a phase of another response signal, for which the second resource index is used.

* * * * *